United States Patent [19]

Horntvedt

[11] Patent Number: 5,590,975

[45] Date of Patent: Jan. 7, 1997

[54] FASTENING ASSEMBLY

[76] Inventor: Earl Horntvedt, 215 Cleveland Ave., Manitowoc, Wis. 54220

[21] Appl. No.: 349,972

[22] Filed: Dec. 6, 1994

[51] Int. Cl.$^6$ .............................. F16G 11/00; B25G 3/00; A47B 88/00; E04B 2/82

[52] U.S. Cl. ................... 403/407.1; 403/320; 403/409.1; 403/DIG. 8; 403/DIG. 10; 312/348.2; 312/348.4; 52/127.11; 52/763

[58] Field of Search ...................................... 403/230, 231, 403/245, 256, 294, 320, 321, 407.1, 409.1, 264, DIG. 8, DIG. 10; 52/127.6, 127.8, 127.11, 128, 129, 289, 702, 763, 767, 549; 312/245, 348.4

[56] References Cited

U.S. PATENT DOCUMENTS 4,599,011  7/1986  Tashiro et al. ...................... 403/407.1
4,783,189  11/1988  Bugg ...................................... 403/264
5,284,401  2/1994  Harley ................................ 403/409.1
5,375,923  12/1994  Hall et al. ............................ 312/348.4

*Primary Examiner*—Brian K. Green
*Assistant Examiner*—Bruce A. Lev
*Attorney, Agent, or Firm*—Tilton, Fallon, Lungmus & Chestnut

[57] ABSTRACT

A fastening assembly for securing a plate member to a support includes a post member, a housing member, and a cam member mounted to the housing member. The post member extends through an opening in the plate member and cooperates with the cam member to place the plate member in compression between the housing and the support.

19 Claims, 2 Drawing Sheets

FASTENING ASSEMBLY

BACKGROUND OF THE INVENTION

1. Field of the Invention

The present invention relates to an assembly that fastens a plate member to a support, and more particularly to a cam and post type fastener used to assemble structures such as ready-to-assemble metal furniture having thin shells. The present invention finds utility in fastening ready-to-assemble metal furniture, but one may employ it in a wide variety of other applications.

2. Description of the Prior Art

The prior art includes a wide variety of fasteners for wood furniture, metal cabinets, and other such objects. Prior fasteners used to assemble metal objects include insert, screw and rivet fasteners designed to permanently attach modules or components together. They also include recently developed anchor and screw-type fasteners.

Prior fasteners used to fasten wood components together include dowels, screws, brackets, and anchors. Some of these connectors are made of metal; others are made of plastic of high strength and rigidity. Minifix Precision Assembly Systems made by Hafele, Inc. and distributed by Hafele America Co. of Archdale, N.C. employs cam and post fasteners for the assembly of ready-to-assemble wood furniture. But these fasteners cannot adequately fasten thin gauge fabricated metal products.

The fastening assembly of the present invention is a cam and post arrangement with a simple construction that minimizes the expense of manufacture and allows quick and effective operation. It operates effectively in thin gauge metal products as well as in a wide variety of applications. It allows the fastening of two structures, with a wall member of one structure placed in face-to-face relation with that of the other structure. It allows the fastening of the wall member of a moveable structure to a permanent wall or base.

SUMMARY OF THE INVENTION

In accordance with the present invention, a fastening assembly for securing a plate member to a support includes a post member, a housing member and a cam member mounted to the housing member. The housing defines a contact surface for engaging the plate member. It lies on one side of the plate member; and the support lies on the other side.

The post member includes a first portion with means for securing the post member to the support on one side of the plate member. It also includes a second position which cooperates with the cam member on the opposite side of the plate member. The post member extends through an opening in the plate member from the support to the cam member.

The cam member defines a camming surface that the second portion of the post member engages to cooperate with the cam member. Thus, the post and cam members place the plate member in compression between the housing member and the support to secure the plate member to the support.

BRIEF DESCRIPTION OF THE DRAWINGS

For a more complete understanding of this invention one should now refer to the embodiment illustrated in greater detail in the accompanying drawings and described below by way of an example of the invention. In the drawings.

While the following disclosure describes the invention in connection with four embodiments, one should understand that the invention is not limited to those embodiments. Furthermore, one should understand that the drawings are not to scale and that graphic symbols, diagrammatic representations, and fragmentary views, in part, may illustrate the embodiments. In certain instances, the disclosure may not include details which are not necessary for an understanding of the present invention such as conventional details of fabrication and assembly.

DETAILED DESCRIPTION OF THE DRAWINGS AND AN EMBODIMENT

Figure 1:
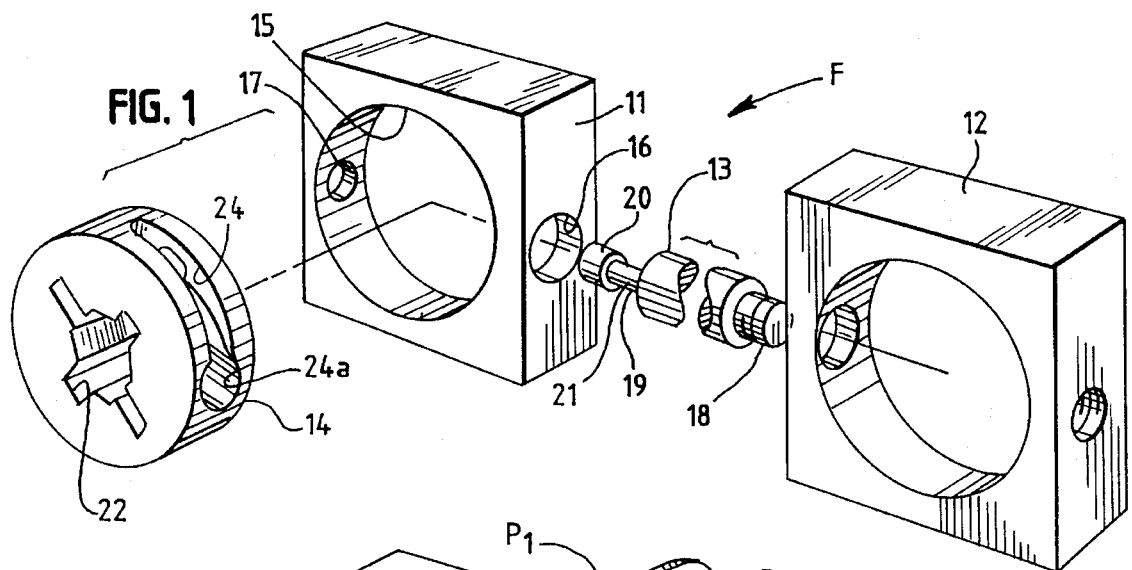
FIG. 1 is an exploded perspective view of the fastening assembly of the present invention.
Figure 2:
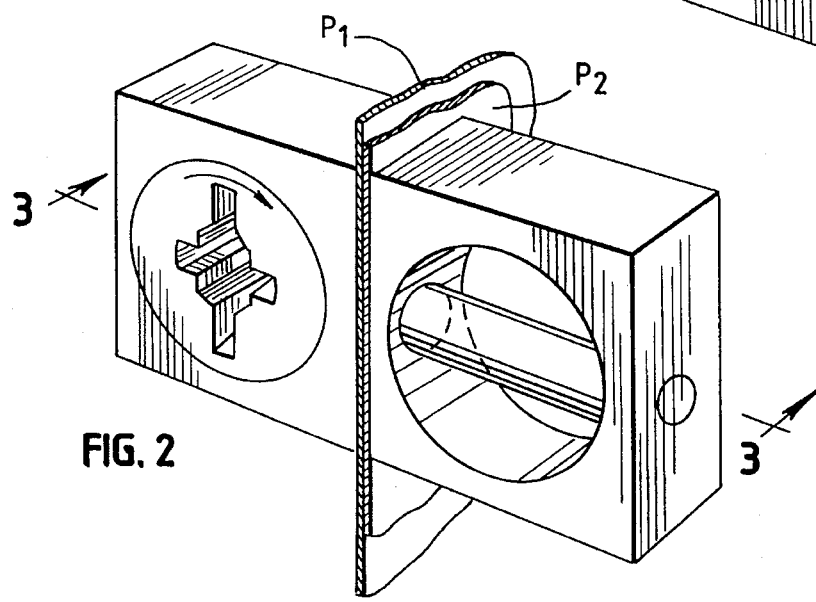
FIG. 2 is a perspective view of the fastening assembly of FIG. 1, showing the assembly in operation as it secures the plate members of the adjacent structures together.
Figure 3:
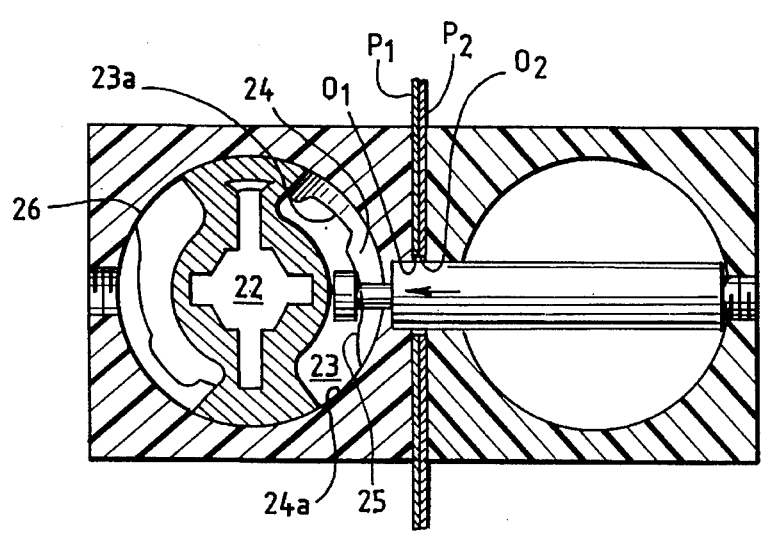
FIG. 3 is a sectional view taken along line 3—3 in FIG. 2.
Figure 4:
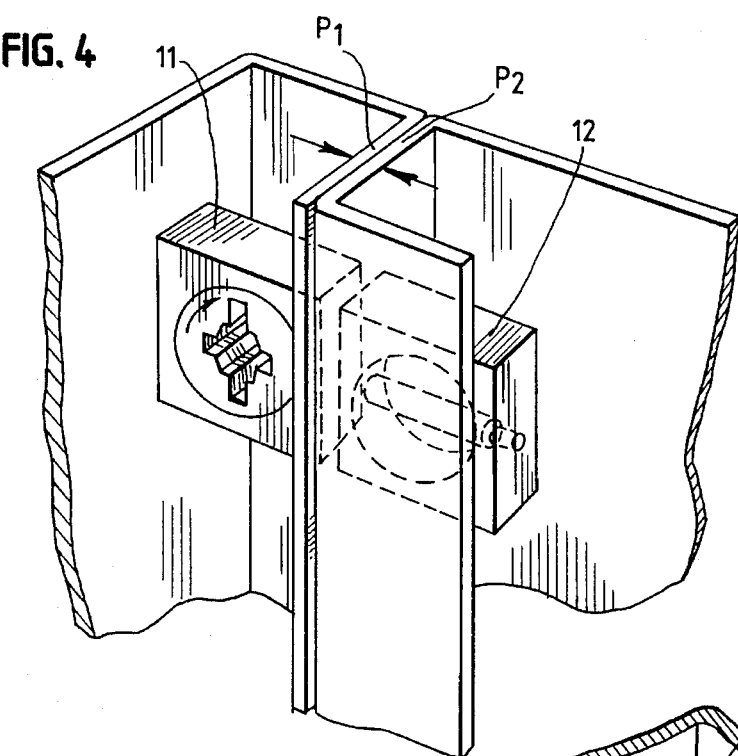
FIG. 4 is a perspective view of an installation of the fastening assembly of the present invention.
Figure 5:
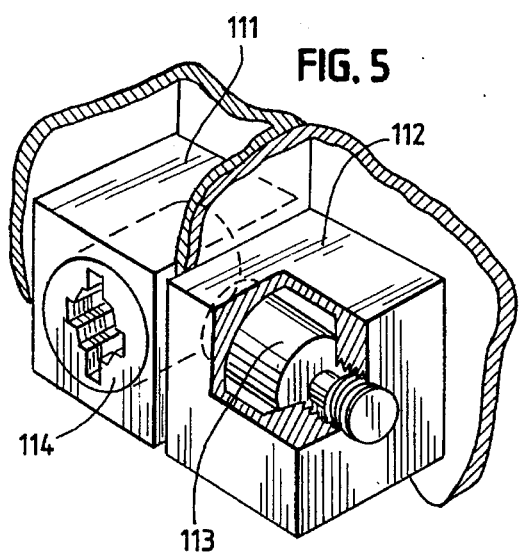
FIG. 5 is a perspective view of an installation of a second embodiment of the fastening assembly of the present invention.
Figure 8:
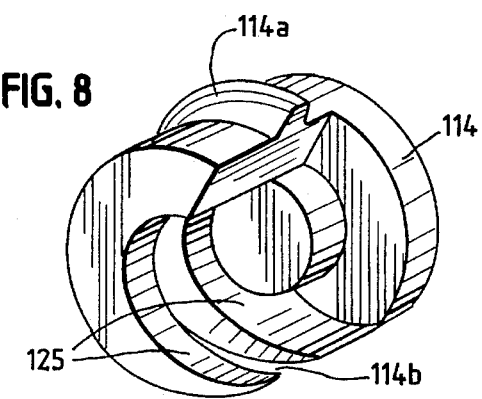
FIG. 8 is a perspective view of the cam member of the second embodiment shown in FIG. 5.

Turning now to the drawings, FIGS. 1–4 show a first embodiment of the fastening assembly F of the present invention, in operation in FIGS. 2–4 and apart in FIG. 1. In this embodiment, the assembly F generally includes a housing member 11, another housing member 12, a post member 13 and a cam member 14. These components operate in the manner described below to secure the plate members $P_1$ and $P_2$ (See FIG. 2) of adjacent structures together.

In the installation shown in FIGS. 2–4, the housing 11 lies on one side of the plates $P_1$ and $P_2$ and the housing 12 lies on the other side. The post member extends between the housings, through openings $O_1$ and $O_2$ in the plates $P_1$ and $P_2$ (See FIG. 3). The openings $O_1$ and $O_2$ in the plates $P_1$ and $P_2$ have a shape similar and slightly larger than the cross-sectional shape of the post member 13 to prevent sliding between the plates.

The housing members 11 and 12 of this embodiment are inter-changeable. (Alternatively, these housing members 11 and 12 may not be interchangeable, and one may differ markedly from the other.) The housing member 11 is a flat plate-like member with six outer faces having rectangular peripheries. It defines a central opening 15, a side opening 16 which extends from one side of the housing to the central opening, and a threaded side opening 17 which extends from an opposite side of the housing to the central opening. The housing member 11 is made from a thermoplastic material or any other suitable material of high strength and rigidity. (The preceding description for housing 11 applies to the housing 12.)

The post member 13 is an elongate member made of metal (e.g., steel) or any other material of high strength and rigidity. It includes a first, threaded end portion 18 which threads into the threaded opening 17 of the housing 12 (in this example). The other, second end portion 19 of the post member 13 includes a bolt like distal end with a head portion 20 and a neck portion 21. It extends through the openings 15 and 16 in the housing 12, the openings $O_1$ and $O_2$ of the plate members $P_1$ and $P_2$, respectively, and the opening 16 of the housing 11. In place, the post member 13 cooperates with the cam member 14 in the manner described below.

The cam member 14 has a round, wheel-like configuration with a diameter slightly smaller than the diameter of the round opening 15 of the housing 11. When installed, in lies rotatably disposed in the opening 15 in sliding engagement with the sidewalls of the opening 15. It is made of a suitable thermoplastic material or any other material of high strength and rigidity.

The cam member 14 defines a central opening 22 which may receive a tool (e.g., the tip of a screw driver) through which an operator can rotate the cam member. It also defines a cavity 23 with an overlying slot 24 along one side of its circumferential face. The slot 24 communicates with the cavity 23; and it has an enlarged portion 24a at one end which allows the head portion 20 to extend into the cavity. The remaining length of the slot has a reduced width which allows the neck portion 21 to extend into the cavity but not the head portion 20.

The edge portions of the cam member 14 adjacent the slot 24 define a camming surface 25. The head portion 20 of the post member 13 engages this surface and slides over it as the cam member rotates. After the head portion 20 has entered the cavity 23 through the enlarged portion of the slot 24, clockwise rotation of the cam member 14 produces a camming action. At the endpoint of this rotation, the head portion 20 "snaps" into an enlarged portion 23a of the cavity 23 to lock the post member 13 and the cam member 14 together.

The embodiment shown in FIGS. 1–4 includes a second cavity and slot arrangement 26 opposite the one described above. This arrangement has the same shape as the one described above. Alternatively, the cam member 14 may have only one such arrangement; or it may have more than the two shown.

The steps of installing the assembly F include: (a) placing the post member 13 through the openings $O_1$ and $O_2$ of the plate members $P_1$ and $P_2$, (b) threading the housing 12 onto the first end of the post member 13, (c) mounting the cam member 14 into the opening 15 of the housing 11 so that the opening 16 and the enlarged portion of the slot 24 register; (d) placing the second end portion of the post member 13 through the opening 16 and the slot 24; and (e) rotating the cam member (clockwise in FIG. 3) until the head portion 20 of the post member snaps into place and the cam member cannot rotate.

Turning now to FIGS. 5–8, FIGS. 5 and 8 show a second, alternative embodiment of the assembly of the present invention. In this embodiment, the housings 111 and 112 have a cube-like shape with faces of equal length and width. Each housing defines a pocket for receiving a post member 113 or a cam member 114. (The pocket or opening does not extend through the entire length of the housing.) The post member 113 has a configuration similar to that of the post member 13 in the first embodiment. The cam member 114 (See FIG. 8) includes a rib 114a which normally extends into a corresponding groove (not shown) in the walls of the housing pocket to releasably secure the cam member in the pocket. The cam member 114 defines a camming surface 125 which engages the head portion of the post member in the same manner as the camming surface 25 of the first embodiment. (The neck portion of the post member 113 extends through the gap 114b during operation of the cam member 114.)

Figure 6:
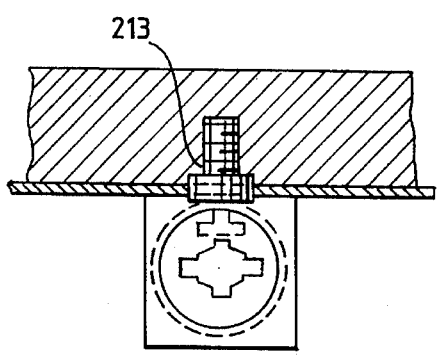
FIG. 6 is a top view of an installation of a third embodiment of the fastening assembly of the present invention.

FIG. 6 shows a third embodiment that does not include a second housing. In this alternative, the first end portion of the post member 213 lies embedded in a permanent wall or base member. The assembly secures a plate member against this wall or base member.

Figure 7:
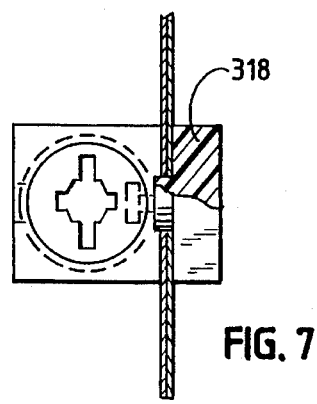
FIG. 7 is a side elevation view of an installation of a fourth embodiment of the fastening assembly of the present invention.

FIG. 7 shows a fourth embodiment where the post member includes an enlarged portion 318 at its first end. This enlarged portion 318 replaces the second housing of the first embodiment; and it is an integrally molded part of the post member. (As a further modification to this fourth embodiment, the enlarged portion 318 may be a solid, separate member with a threaded opening for receiving a threaded end portion of the post member.)

While the above description and the drawings disclose and illustrate four embodiments, one should understand, of course, that the invention is not limited to those embodiments. Those skilled in the art to which the invention pertains may make modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A fastening assembly securing a plate member with an opening to a support, said comprising: a plate member with a predetermined thickness; a post member with a first end portion for securing the post member with a first end portion for securing the post member to a support, said post member extending through an opening across the entire thickness of the plate member; a block housing member defining a contact surface for engaging the plate member, said housing member and said plate member being separate members; and a cam member mounted to the housing member, said cam member defining a camming surface; a second end portion of the post member engaging the camming surface and cooperating with the cam member to place the plate member in compression between the housing member and the support, the housing member being substantially smaller than the plate member.

2. The assembly of claim 1, wherein the cam member is rotatably mounted to the housing member.

3. The assembly of claim 2, wherein the cam member is a generally rounded member.

4. The assembly of claim 3, wherein the cam member defines an internal cavity and a slot through which the post member extends into the cam member.

5. The assembly of claim 4, wherein the camming surface is a wall of the cavity.

6. The assembly of claim 5, wherein the second end portion of the post member has a head portion and a neck portion, the head portion engaging the camming surface.

7. The assembly of claim 3, wherein the cam member has an annular configuration.

8. The assembly of claim 2, wherein the cam member includes means for rotating the cam member.

9. The assembly of claim 8, wherein the means for rotating is a tool-receiving slot.

10. The assembly of claim 1, wherein the housing member defines a first opening for receiving the cam member and a second opening in communication with the first opening, the second portion of the post member extending through the second opening to cooperate with the cam member.

11. The assembly of claim 10, wherein the housing member has a rectangular configuration.

12. The assembly of claim 1, wherein the support includes another thin plate member and the means for securing the post member includes a threaded portion on the first portion of the post member and a second housing releasably secured to the post member over the threaded portion.

13. The assembly of claim 1, wherein the support includes a wall or a base and the second portion of the post member is embedded in the wall or base.

14. The assembly of claim 1, wherein the cam member includes a rib for releasably securing the cam member to the housing member.

15. The assembly of claim 1, wherein the support includes another plate member and the means for securing the post member includes an enlarged portion at the first portion of the post member.

16. A fastening assembly comprising: a thin plate member with a predetermined thickness; a post member with a first end portion for securing the post member to a support, said post member extending through an opening in the plate member across the entire thickness of the plate member; a block housing member defining a first opening, a second opening in communication with the first opening and a contact surface for engaging the plate member, said housing and said plate members being separate members and a cam member rotatably mounted in the first opening of the housing, said cam member defining a camming surface; a second portion of the poet member engaging the camming surface and cooperating with the cam member to place the plate member in compression between the housing member and the support.

17. The assembly of claim 16, wherein the second portion of the post member has a head portion and a neck portion, and wherein the cam member has an annular configuration with a slot along the end face of the cam member and an internal cavity underlying the slot and portions of the cam member adjacent the slot, said adjacent portions defining the camming surface.

18. The assembly of claim 17, wherein the slot is enlarged at one end to allow the post member to extend into the cavity, and the cavity has a locking portion at the other end of the slot for receiving the head portion of the post member to lock the cam and post members together.

19. An assembly comprising first and second thin plate members disposed in face-to-face relation with each plate member defining an opening that extends through the entire thickness of the plate member, a post member disposed through the openings of the plate members, said post member having a first end portion disposed on one side of the plate members and a second end portion disposed on the opposite side of the plate members, a block housing member releasably mounted to the first end portion of the post member, said housing member having a contact surface for engaging one of the plate members, another block housing member defining a contact surface for engaging the other plate member, and a cam member mounted to said another housing member, said cam member defining a camming surface, the second end portion of the post member engaging the camming surface and cooperating with the cam member to place the first and second plate members in compression between the two housings, said housing members and said plate members being separate members.

* * * * *

UNITED STATES PATENT AND TRADEMARK OFFICE
CERTIFICATE OF CORRECTION

PATENT NO. : 5,590,975
DATED : January 7, 1997
INVENTOR(S) : Earl Horntvedt

It is certified that error appears in the above-indentified patent and that said Letters Patent is hereby corrected as shown below:

```
Claim 1, column 4, line 29, delete "securing a plate member with an".
Claim 1, column 4, line 30, delete "opening to a support, said".
Claim 1, column 4, line 32, delete "with a first end portion".
Claim 1, column 4, line 33, delete "for securing the post member".
Claim 16, column 5, line 26, after "separate members" insert --;--.
Claim 16, column 5, line 29, delete "poet" and substitute therefor
--post--.
```

Signed and Sealed this

Eighth Day of April, 1997

Attest:

BRUCE LEHMAN

Attesting Officer

Commissioner of Patents and Trademarks